United States Patent
Ma et al.

(10) Patent No.: US 9,373,876 B2
(45) Date of Patent: Jun. 21, 2016

(54) MULTIPLE-MODE FILTER FOR RADIO FREQUENCY INTEGRATED CIRCUITS

(75) Inventors: Kai Xue Ma, Singapore (SG); Kok Meng Lim, Singapore (SG); Kiat Seng Yeo, Singapore (SG); Jian-guo Ma, Singapore (SG)

(73) Assignee: Nanyang Technological University, Singapore (SG)

( * ) Notice: Subject to any disclaimer, the term of this patent is extended or adjusted under 35 U.S.C. 154(b) by 310 days.

(21) Appl. No.: 13/881,573

(22) PCT Filed: Oct. 27, 2011

(86) PCT No.: PCT/SG2011/000377
§ 371 (c)(1),
(2), (4) Date: Oct. 15, 2013

(87) PCT Pub. No.: WO2012/057708
PCT Pub. Date: May 3, 2012

(65) Prior Publication Data
US 2014/0035703 A1  Feb. 6, 2014

Related U.S. Application Data

(60) Provisional application No. 61/406,588, filed on Oct. 26, 2010.

(51) Int. Cl.
*H01P 1/205* (2006.01)
*H01P 1/203* (2006.01)
*H04B 3/21* (2006.01)

(52) U.S. Cl.
CPC ............ *H01P 1/203* (2013.01); *H01P 1/20336* (2013.01); *H01P 1/20363* (2013.01); *H04B 3/21* (2013.01); *H01P 1/20327* (2013.01)

(58) Field of Classification Search
CPC . H01P 1/203; H01P 1/20327; H01P 1/20354; H01P 1/20363
USPC .................................. 333/204, 205, 219, 235
See application file for complete search history.

(56) References Cited

U.S. PATENT DOCUMENTS

| | | | |
|---|---|---|---|
| 6,091,312 A * | 7/2000 | Sheen | 333/176 |
| 6,252,476 B1 | 6/2001 | Maloratsky | |
| 7,145,418 B2 * | 12/2006 | Akale et al. | 333/204 |
| 2004/0257174 A1 * | 12/2004 | Amano | 333/204 |

FOREIGN PATENT DOCUMENTS

| | | |
|---|---|---|
| EP | 371446 | 6/1990 |
| WO | WO2006065384 | 6/2006 |

OTHER PUBLICATIONS

Ma, et al., Passive Circuit Designs Toward Terahertz Using Nanometer CMOS Technology, International Symposium on Integrated Circuits 671 (2009).
Deng, et al., Compact Wideband Bandpass Filter with Quadruple-Mode Stub-Loaded Resonator, 17 Progress in Electomagnetics Research Letters 125 (2010).

* cited by examiner

*Primary Examiner* — Robert Pascal
*Assistant Examiner* — Gerald Stevens
(74) *Attorney, Agent, or Firm* — K. David Crockett, Esq.; Niky Economy Syrengelas, Esq.; Crockett & Crockett, PC

(57) ABSTRACT

A fully integrated silicon-based bandpass filter which lends itself to applications in the gigahertz region is disclosed. The bandpass filter is fabricated on an integrated circuit and operates as a microwave/millimeter-wave filtering circuit. In accordance with one aspect, the bandpass filter includes a first set and a second set of filter coupled elements, a three-port "T" transmission line junction and a perturbing element. The three-port "T" transmission line junction has a first port coupled to a first end of a first one of the first set of filter coupled elements and a second port coupled to a first end of a first one of the second set of filter coupled elements. The perturbing element is coupled to a third port of the three-port "T" transmission line junction. A second one of the first set of filter coupled elements includes an input transmission line and has a first end thereof coupled to an input port and an opposite end thereof having an open end. A second one of the second set of filter coupled elements includes an output transmission line and has a first end thereof coupled to an output port and an opposite end thereof having an open end.

17 Claims, 12 Drawing Sheets

MULTIPLE-MODE FILTER FOR RADIO FREQUENCY INTEGRATED CIRCUITS

CROSS-REFERENCE TO RELATED APPLICATION

The present application claims priority to U.S. Provisional Patent Application No. 61/406,588, filed Oct. 26, 2010.

FIELD OF THE INVENTION

The present invention generally relates to multiple-mode filters, and more particularly relates to a multiple-mode filter suitable for implementation in a radio frequency (RF) integrated circuit.

BACKGROUND OF THE DISCLOSURE

For many communication devices, microwave filters are an integral block. Filters having high performance while utilizing small silicon area are highly sought after because commercial market trends are constantly striving towards low cost and highly integrated solutions.

Silicon based manufacturing processes have been the dominant leader in low cost and ability to achieve a high level of integration. However, passive filters have difficulty being integrated onto silicon substrates. Firstly, passive devices are silicon area hungry and lump elements or transmission line filters are known to occupy huge areas, often making them too impractical to be integrated on an integrated circuit chip. This situation is made worse in lower frequency applications where the required sizes for effective operation of such low frequency filters are even larger. Secondly, silicon substrates are very lossy which has a huge impact on integrated filters. The lossiness of the silicon substrates results in poor filter performance. And at higher frequencies, substrate losses are more pronounced.

Consequently, in a bid to achieve a high level of integration, typical filter development is based upon active filter topologies. Active filters, however, consume current, making them not very suitable for wireless mobile applications which operate from a limited battery source.

There have been numerous works and publications on the fabrication of passive filters based on silicon process. For example, a planar ring resonator has been fabricated within a CMOS manufacturing process. The ring resonator includes a perturb stub and functions as a dual mode bandpass filter at 60 GHz. Yet the silicon area required for fabrication is still large and the resonator has poor selectivity. In another implementation, a bandpass filter operating at 77 GHz has been fabricated within a Silicon Germanium (SiGe) manufacturing process. The filter employs lumped elements, spiral inductors and metal insulator metal (MIM) capacitors, yet still suffers from high insertion loss. Other attempts include attempts to incorporate a filter monolithically.

In a bid to achieve high integration, film bulk acoustic resonators (FBAR) are used in conventional filter designs. Unlike ceramic and surface acoustic filters (SAW), fabrication of FBAR filters is compatible with conventional integrated circuit materials and manufacturing technologies. FBAR devices include a piezoelectric layer, such as zinc oxide or aluminum nitride, sandwiched between two electrodes and positioned above a cavity in a substrate. Through a combination of series and shunt FBAR resonators in a ladder configuration, bandpass filtering can be performed. Similar to FBARs, high aspect ratio interlocking transducers (IDTs) and reflectors allow CMOS based SAW resonators to achieve GHz frequencies with high quality functionality. However, FBAR or SAW filters implemented with current technologies are limited to those operable at frequencies below 5 GHz.

Through the use of thru-silicon-via (TSV) structures, another bandpass filter design can be realized. Parallel TSV structures can form a pair of electrically coupled lines to perform filtering functions. However, FBAR, SAW and TSV structures all require special processing steps, limiting their scalability into standard IC technologies such as CMOS, SiGe BiCMOS, GaAs and InP. These special processing steps are not within standard silicon fabrication processes, thereby requiring special care and materials which leads to both cost and reliability issues.

Thus, what is needed is a high performance filter design requiring small silicon area while being highly scalable into one or more of the conventional integrated circuit fabrication technologies. Furthermore, other desirable features and characteristics will become apparent from the subsequent detailed description and the appended claims, taken in conjunction with the accompanying drawings and this background of the disclosure.

SUMMARY

In accordance with one aspect, a multimode bandpass filter is provided. The bandpass filter is fabricated on an integrated circuit and includes a first set and a second set of filter coupled elements and a perturbing element. The first set of filter coupled elements, the second set of filter coupled elements and the perturbing element are all coupled to a common node. A first end of a first one of the first set of filter coupled elements and a first end of a first one of the second set of filter coupled elements are coupled to the common node. A second one of the first set of filter coupled elements includes an input transmission line having one end coupled to an input port and an opposite end being open-ended. Similarly, a second one of the second set of filter coupled elements includes an output transmission line having one end coupled to an output port and an opposite end being open-ended.

In accordance with one aspect, a multimode bandpass filter is provided. The bandpass filter is fabricated on an integrated circuit and operates as a microwave/millimeter-wave filtering circuit. The bandpass filter includes a first set and a second set of filter coupled elements, a three-port "T" transmission line junction and a perturbing element. The three-port "T" transmission line junction has a first port coupled to a first end of a first one of the first set of filter coupled elements and a second port coupled to a first end of a first one of the second set of filter coupled elements. The perturbing element is coupled to a third port of the three-port "T" transmission line junction. A second one of the first set of filter coupled elements includes an input transmission line and has a first end thereof coupled to an input port and an opposite end thereof having an open end. A second one of the second set of filter coupled elements includes an output transmission line and has a first end thereof coupled to an output port and an opposite end thereof having an open end.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

FIG. 4A illustrates a non-elliptical multimode bandpass filter in accordance with the present embodiment wherein a perturbing stub thereof is replaced with a lumped element capacitor. FIG. 4B illustrates an elliptical multimode bandpass filter in accordance with the present embodiment wherein a perturbing stub thereof is replaced with a lumped element capacitor.

FIG. 5A is a perspective view of the non-elliptical multimode filter in accordance with the present embodiment wherein a ground shield is not depicted. FIG. 5B is a perspective view of the elliptical multimode filter in accordance with the present embodiment wherein a ground shield is not depicted.

FIG. 6A is a front, right, top perspective view of the non-elliptical multimode filter in accordance with the present embodiment wherein a ground shield is not depicted. FIG. 6B is a side planar view of the non-elliptical multimode filter in accordance with the present embodiment with the ground shield illustrated.

FIG. 7A is a front, right, top perspective view of the non-elliptical multimode bandpass filter with offset in accordance with the present embodiment wherein a ground shield is not depicted. FIG. 7B is a side planar view of the non-elliptical multimode bandpass filter with offset in accordance with the present embodiment with the ground shield illustrated.

FIG. 8A is a front, right, top perspective view of the non-elliptical multimode bandpass filter with input ports feeding from a higher metallization layer and with offset in accordance with the present embodiment wherein a ground shield is not depicted. FIG. 8B is a side planar view of the non-elliptical multimode bandpass filter with input ports feeding from a higher metallization layer and with offset in accordance with the present embodiment wherein the ground shield illustrated.

FIG. 10A is a view of a non-elliptical multimode bandpass filter with interlocking fingers for the coupled transmission lines in accordance with the present embodiment wherein a ground shield is not depicted.

FIG. 10B is a view of an elliptical multimode bandpass filter with multiple interlocking fingers in accordance with the present embodiment wherein the ground shield is not illustrated.

FIG. 11A is a view of a non-elliptical multimode bandpass filter with hairpin resonators in accordance with the present embodiment wherein a ground shield is not depicted. FIG. 11B is a view of an elliptical multimode bandpass filter with miniaturized hairpin resonators in accordance with the present embodiment wherein the ground shield is not illustrated.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description of the invention.

It is an object of the present invention to provide a filter which is able to overcome the limitations of the prior art, such as difficult to scale and high cost and high silicon area requirements. A bandpass filter structure is introduced which uses two pairs of coupling elements to provide rejection of out of band signals. In accordance with this present embodiment, a perturb element is added between the coupling elements, allowing the filter to operate in multimodes due to the creation of additional transmission zeros. Multimode functionality allows the filter to have selectivity across a wider bandwidth with low insertion loss. Fabrication of a multimode bandpass filter in accordance with this present embodiment is fully compatible with standard silicon-based processes without the use of additional processing steps. Further, due to its ability to be fabricated on a silicon-based substrate, the filter may be miniaturized in order to be fully integrated for a complete system on chip (SoC) solution. Also, the filter can advantageously be fabricated in a multilayered configuration for further miniaturization. These and other features, and the advantages achieved thereby, are described in greater detail hereinafter.

Figure 1:
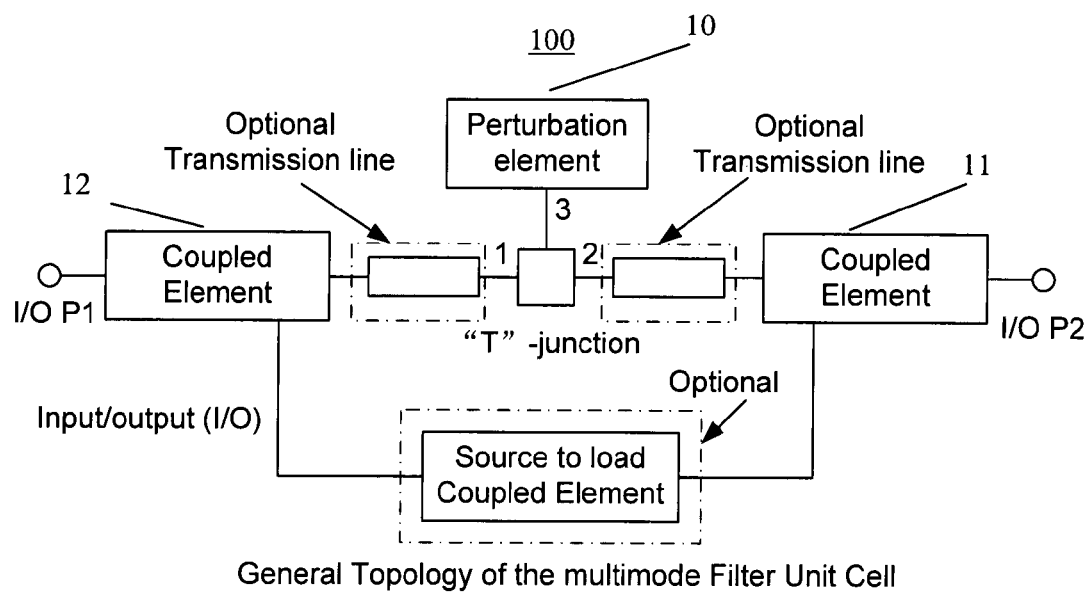
FIG. 1 is a block diagram illustrating a multimode filter in accordance with a present embodiment.

Referring to FIG. 1, a block diagram of a non-elliptical multimode bandpass filter 100 in accordance with a present embodiment is depicted. First and second filter coupled elements 11, 12 are unit elements representing coupled transmission lines. Coupling elements represented by even and odd mode impedances with a magnetically coupled transformer with a −1:1 ratio couple the first filter coupled elements 11 to the second filter coupled elements 12. These coupling elements have a characteristic impedance of $Z_0$ and an electrical length of $\theta_0$. A perturbing element 10, having a value of $Y_s$, is connected in shunt in the middle of the equivalent networks of the coupled transmission lines of the first and second filter sections 11, 12.

With the introduction of $Y_s$, the transfer function from input port $P_1$ to output port $P_2$ can be modified to introduce more transmission zeros. Depending on the transmission zeros introduced, the bandpass filtering shape can be changed accordingly. The filter utilizes electromagnetically coupled transmission lines with the perturb stub 10 for an improved multimode filter design. The multimode filter in accordance with the present embodiment is capable of optionally setting multimode perturbation and transmission zero generation while maintaining a filter pass bandwidth by selecting a certain combination of the parameters of width, spacing of the coupled transmissions lines of the filter coupled elements 11, 12, and size of the open (perturb) stub 10.

The filter coupled elements 11, 12 and the perturbing element 10 are coupled together at a common node. Alternatively, the common node could be a three-port "T" transmission line junction having a first port (1) coupled to the filter coupled elements 12, a second port (2) coupled to the filter coupled elements 11 and a third port (3) coupled to the perturbing element 10. Also, optional transmission lines could be coupled between the filter coupled elements 11, 12 and the common node or three-port "T" transmission line junction.

Figure 2:
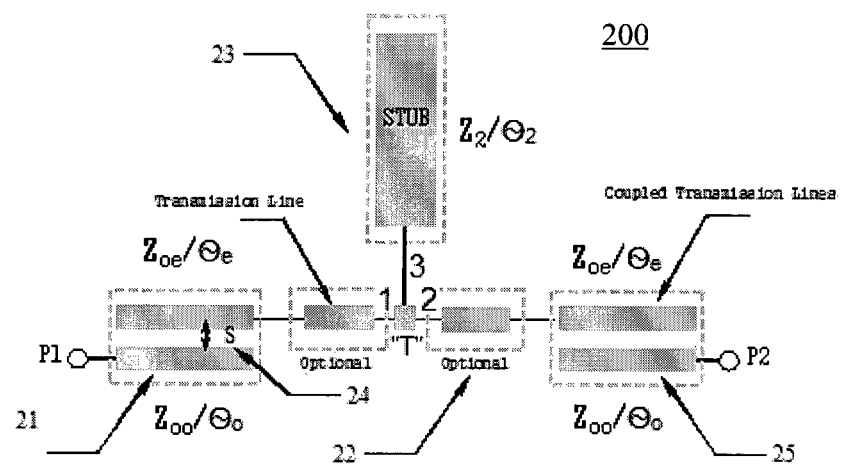
FIG. 2 is a top planar view illustrating a transmission line model of a non-elliptical multimode filter in accordance with a first aspect of the present embodiment.

FIG. 2 depicts a top planar view of a transmission line model of a non-elliptical multimode filter 200 in accordance with a first aspect of the present embodiment. The multimode bandpass filter 200 shows the proposed filter configuration, including an open stub 23 with impedance $Z_2$ and electric length $\theta_2$. The open stub 23 is connected to a third port (3) of a three-port "T" transmission line junction which couples a first port (1) to a first end of a first one of a first filter coupled elements 21 and couples a second port (2) to a first end of a first one of a second filter coupled elements 25. A second one of the first set of filter coupled elements 21 includes an input transmission line and has a first end coupled to the input port P1 and an opposite end being open-ended. A second one of the second set of filter coupled elements 25 includes an output transmission line and has a first end coupled to the output port P2 and an opposite end open-ended. The coupled transmission lines advantageously provide both even-mode impedance and electric length of $Z_{oe}$ and $\theta_e$ and odd mode impedance and electrical length $Z_{oo}$ and $\theta_0$, respectively.

A coupling gap S 24 together with the parameters of the open stub 23 determines the passband bandwidth and the operation modes of the filter 200. Therefore, under different coupling conditions, the number of resonating poles generated is different. For example, for weakly coupled situations the number of poles generated is lower, while for strongly coupled conditions, additional poles introduced by open stub 23 allow multimode operation.

The coupled transmission lines of the filter coupled elements 21, 25 could make use of coupled microstrip lines. The structure could also make use of other forms of microwave transmission medium such as coupled CPW lines. Also, other than only using a straight stub architecture for the perturb element 23, the perturb element 23 could be a radial stub or a stepped stub. These listings of transmission line mediums and stub structures are not limited to those disclosed, as those skilled in the art will realize that numerous other structures could be utilized in accordance with the principles and overall structure set out in this filter design. Furthermore, optional transmission lines 22 could be added to the filter structure to connect the filter coupled elements 21, 25 to the first port (1) and the second port (2) of the three-port "T" transmission line junction.

Figure 3:
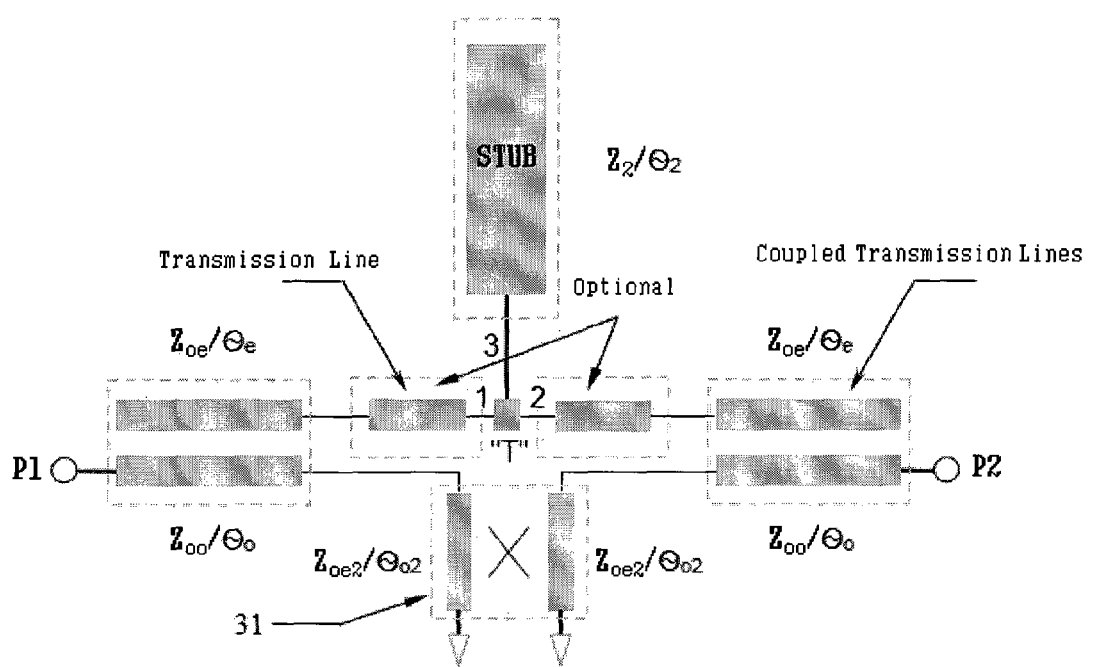
FIG. 3 is a diagram illustrating a transmission line model of an elliptical multimode filter in accordance with a second aspect of the present embodiment.

Referring to FIG. 3, a diagram illustrates a transmission line model of an elliptical multimode filter 300 in accordance with a second aspect of the present embodiment. With the introduction of additional coupled transmission lines 31 to the filter 200, the filter 300 can generate an elliptical filter transfer function. One end of the newly introduced transmission lines 31 are terminated to ground while the other ends are coupled to the input transmission line of the first filter coupled elements and the output transmission line of the second filter coupled elements opposite the coupling to the input port P1 and the output port P2, respectively. The elliptical filter 300 advantageously improves rejection near the passband as compared to all-pole filters. While shown in FIG. 3 as straight stubs, the coupled transmission lines 31 can be formed as meander-line coupled lines, coupled transformers or coupled inductors with one end shorted to ground. Thus, the structure can be established in a way that reduces required silicon area while still providing the improved performance of an elliptical filter.

Figure 4A:
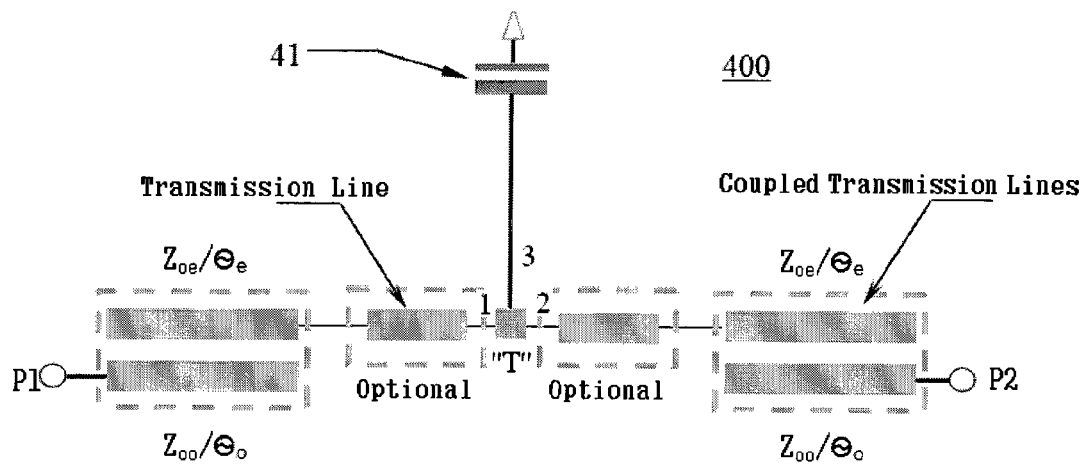
FIGS. 4A and 4B are diagrams illustrating transmission line models of multimode filters with an open stub thereof replaced with a lumped element capacitor.
Figure 4B:
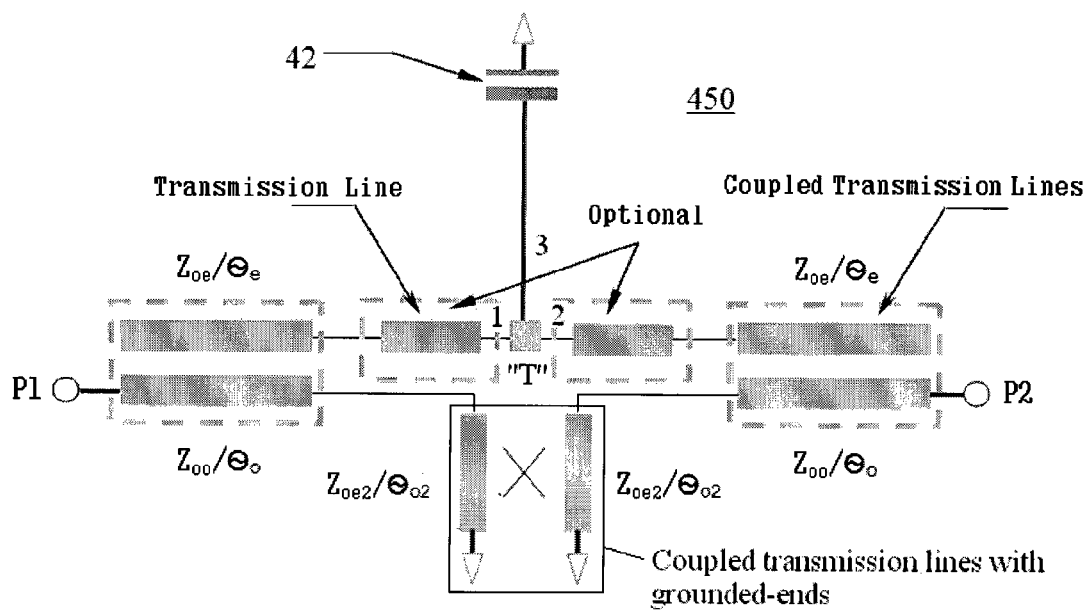

FIGS. 4A and 4B are diagrams illustrating transmission line models of multimode filters with an open stub thereof replaced with a lumped element capacitor in both a non-elliptical mode filter 400 and an elliptical mode filter 450. FIG. 4A illustrates the non-elliptical multimode bandpass filter 400 in accordance with the present embodiment wherein the perturbing stub 23 (FIG. 2) is replaced with an equivalent lumped element capacitor 41. FIG. 4B illustrates the elliptical multimode bandpass filter 450 in accordance with the present embodiment wherein the perturbing stub 23 (FIG. 2) is replaced with an equivalent lumped element capacitor 42. The capacitor 41, 42 can be a known metal insulator metal (MIM) capacitor structure, a poly insulator poly (PIP) capacitor structure, a MOSFET capacitor structure, an interdigital capacitor structure or any capacitive structure.

Figure 5A:
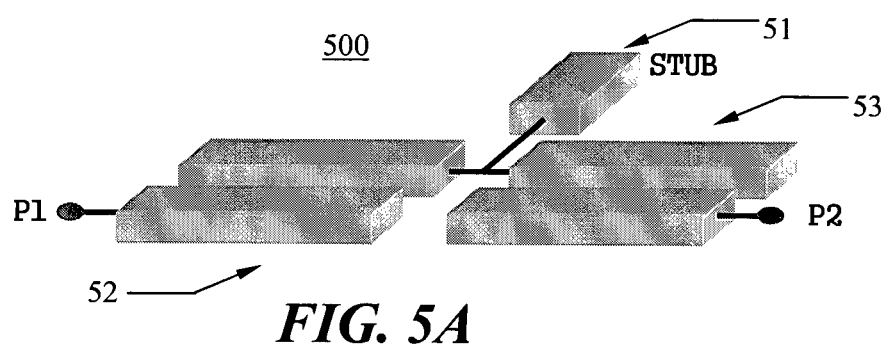
FIGS. 5A and 5B are front, right, top perspective views illustrating transmission line models of a non-elliptical multimode filter and an elliptical multimode filter in accordance with the present embodiment.
Figure 5B:
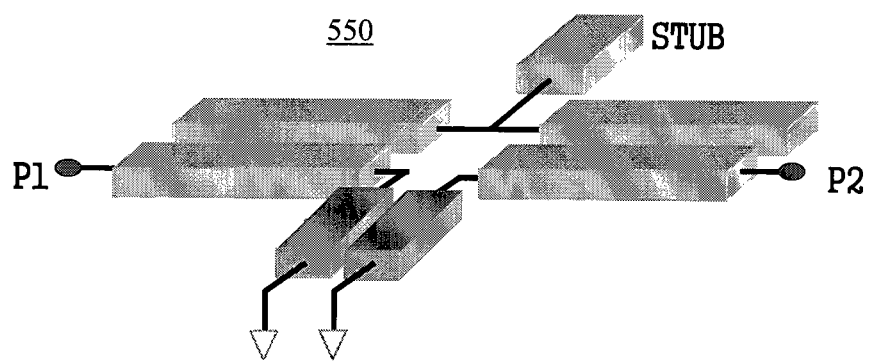

FIGS. 5A and 5B are front, right, top perspective views illustrating transmission line models of a non-elliptical multimode filter 500 and an elliptical multimode filter 550 in accordance with the present embodiment. FIG. 5A is a perspective view of the non-elliptical multimode filter 500 wherein a ground shield is not depicted. FIG. 5B is a perspective view of the elliptical multimode filter 550 wherein a ground shield is also not depicted. FIG. 5A depicts the three dimensional transmission lines representation of the non-elliptical filter 200 of FIG. 2. Similarly, FIG. 5B depicts the three dimensional transmission lines representation of the elliptical filter 300 of FIG. 3. The coupled transmission lines on the left hand side are represented by horizontal coupled lines 52, while the coupled lines on the right hand side is shown by coupled lines 53. The open stub is represented by structure 51. The coupled lines 52, 53 and stub 51 are fabricated within the same metallization layer. The optional transmission lines are not shown.

For the structures 500, 550 illustrated in FIGS. 5A and 5B, the coupled elements are fabricated using microstrip transmission lines. Those skilled in the art will realize that other transmission line structures could also be employed. Since the filters 500,550 can be constructed monolithically, they can be fabricated within any metallization layer, limited only by the process technology node. Grounding can be provided by a substrate ground for the microstrip transmission lines. Alternatively, any other metallization layer below the filter 500, 550 could be used as a ground shield.

For example, in a CMOS 0.18 μm technology process having six metallization layers, top layer 6 could be used for the construction of the filter 500,550. Any of the substrate layer, metal 1 layer, metal 2 layer, metal 3 layer, metal 4 layer, or metal 5 layer could be used for the ground shield. By no means is the filter fabrication limited to the metal layer(s) as used in the description of the example. Those skilled in the art will realize that other metals layers are equally applicable.

Any metal layer could be used to form the filter coupled to a corresponding lower metal ground shield for the microstrip transmission lines. This is applicable to the structures described throughout this patent application, including the structures of FIGS. 6A, 6B, 7A, 7B, 8A, 8B, 9, 10A, 10B, 11A and 11B.

Figure 6A:
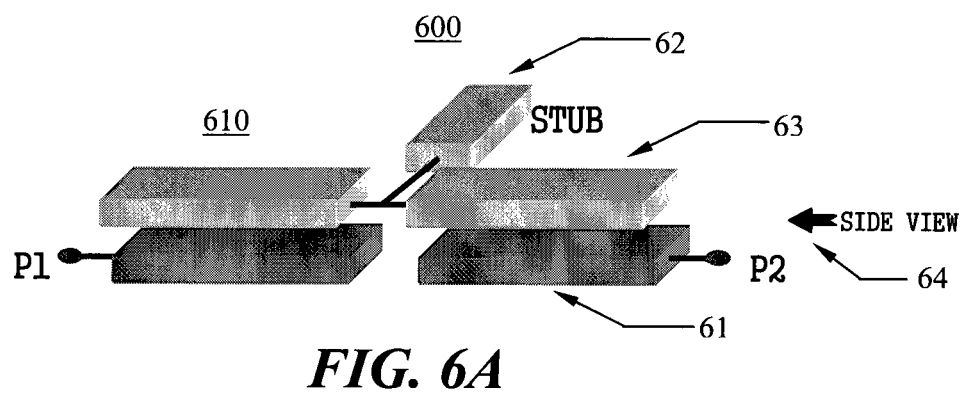
FIGS. 6A and 6B are views illustrating a non-elliptical multimode filter in accordance with the present embodiment.
Figure 6B:
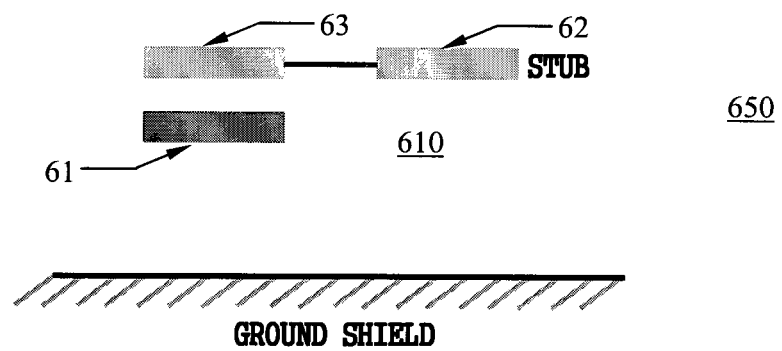

FIGS. 6A and 6B depict another example of the proposed filter. FIG. 6A is a front, right, top perspective view 600 of a non-elliptical multimode filter 610 in accordance with the present embodiment wherein a ground shield is not depicted. FIG. 6B is a side planar view 650 of the non-elliptical multimode filter 610 in accordance with the present embodiment with the ground shield illustrated. The coupled transmission lines 61, 63 in the non-elliptical multimode filter 610 are vertically coupled as shown in the perspective view 600. Input and output feeds and the odd impedance lines of one of the coupled transmission lines 61 are formed in a lower metallization layer while a stub 62 and the even impedance lines of a second one of the coupled transmission lines 63 are formed in a higher metallization layer. The side planar view 650 is a view of the non-elliptical multimode filter 610 in the direction of arrow 64 (FIG. 6A). The view 650 shows that the odd and even impedance lines 61, 63 of the filter 610 overlap exactly. The optional transmission lines are not shown in either view 600, 650.

The filter 610 is a non-elliptical filter. The structure shown in FIGS. 6A and 6B is also applicable to an elliptical filter. Also, while microstrip transmission lines are depicted in the views 600,650, other transmission lines could also be used. Further, since the filter 610 can be constructed monolithically, the filter 610 can be fabricated within any metallization layer, limited only by the process technology node. Grounding can be provided by a substrate ground or any other metallization layer below the metallization layers incorporating the microstrip transmission lines 61, 63 of the filter 610 could be used as the ground shield. For example, with a technology node of six metallization layers, top metallization layer 6 could be used for the even impedance lines 63 as well as the perturb stub 62; odd impedance lines 61 could be fabricated within metallization layer 5, and any lower metallization layer or the substrate could act as the around shield. The metallization layer structures discussed herein are by way of example only; by no means is the filter 610 fabrication limited to the metallization layers described as other metallization layers can be combined to achieve the same function.

Figure 7A:
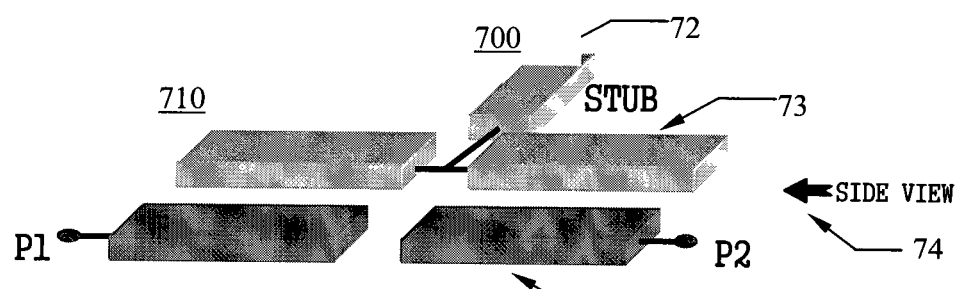
FIGS. 7A and 7B are views illustrating a non-elliptical multimode bandpass filter with skew coupling in accordance with the present embodiment.
Figure 7B:
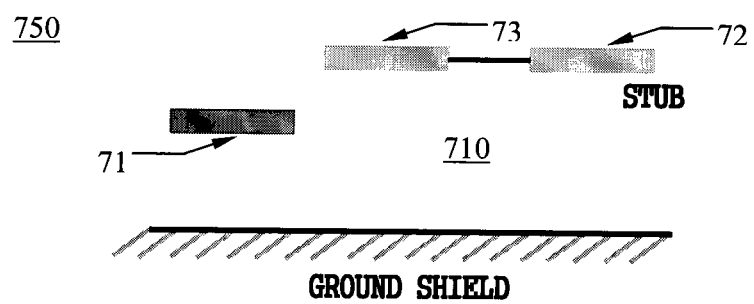

Referring to FIGS. 7A and 7B, additional views 700, 750 depict another example of a proposed filter 710. FIGS. 7A and 7B are views 700, 750 illustrating a non-elliptical multimode bandpass filter 710 with skew coupling in accordance with the present embodiment. FIG. 7A is a front, right, top perspective view 700 of the non-elliptical multimode bandpass filter 710 with offset in accordance with the present embodiment wherein a ground shield is not depicted. The coupled transmission lines 71, 73 now makes use of a combination of horizontal and vertical coupling. Inputs and outputs feed in to the odd impedance lines 71 in a first metallization layer while a stub 72 and the even impedance lines 73 are formed within a higher metallization layer. FIG. 7B is a side planar view 750 of the non-elliptical multimode bandpass filter 710 with offset in accordance with the present embodiment and with the ground shield illustrated. The view 750 is a view of the filter 710 as seen in the direction of arrow 74. The odd and even impedance lines 71, 73 do not overlap in the vertical direction. Instead, the odd and even impedance lines 71, 73 are offset by a certain distance. The optional transmission lines are not shown in either view 700,750.

While a non-elliptical filter 710 is depicted in FIGS. 7A and 7B, the transmission line arrangement is equally applicable to elliptical filter structures in accordance with the present embodiment. In addition, while microstrip transmission lines are shown, this is for illustration purposes only and it is understood that other transmission lines could be utilized. Since the filter 710 can be constructed monolithically, the filter 710 can be fabricated and the grounding can be provided in any metallization layer in the manner discussed and the limitations described in regards to FIGS. 6A and 6B.

Figure 8A:
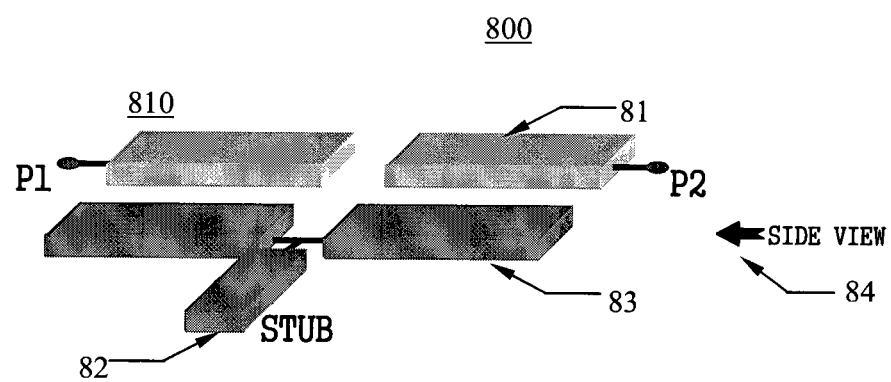
FIGS. 8A and 8B are views illustrating a non-elliptical multimode bandpass filter with input ports feeding from a higher metallization layer and with offset in accordance with the present embodiment.
Figure 8B:
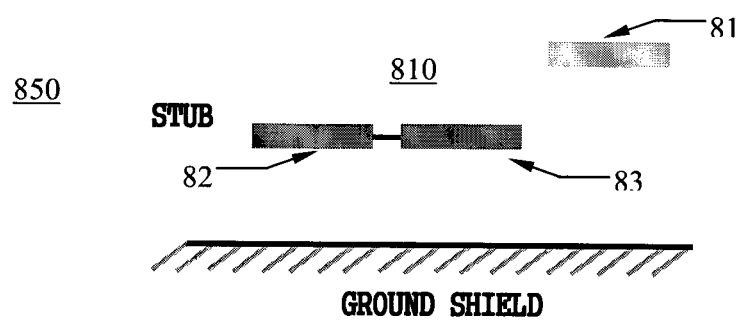

FIG. 8A is a front, right, top perspective view 800 of a non-elliptical multimode bandpass filter 810 with input ports feeding from a higher metallization layer and with offset in accordance with the present embodiment. FIG. 8B is a side planar view 850 of the non-elliptical multimode bandpass filter 810 with input ports feeding from a higher metallization layer and with offset in accordance with the present embodiment wherein the ground shield illustrated. Coupled transmission lines 81, 83, similar to the coupled transmission lines 71, 73, make use of a combination of horizontal and vertical coupling. Inputs and outputs are fed from a higher metallization layer through odd impedance lines 81 of the coupled transmission lines 81, 83. A stub 82 and the even impedance lines 83 are offset and formed within a lower metallization layer.

The view 800 depicts a non-elliptical mode bandpass filter 810 with offset wherein a ground shield is not depicted, and the view 850 depicts a side planar view (in the direction of arrow 84, FIG. 8A) of the non-elliptical mode bandpass filter 810 with offset with the ground shield depicted. While the odd and even impedance lines can exactly overlap as shown in views 600, 650 (FIGS. 6A and 6B), in the filter 810 seen in the views 800, 850 has the coupled odd and even impedance lines 81, 83 offset a certain distance. The optional transmission lines are not shown in either view 800,850.

While a non-elliptical filter 810 is depicted in FIGS. 8A and 8B, the transmission line arrangement is equally applicable to elliptical filter structures in accordance with the present embodiment. In addition, while microstrip transmission lines are shown, this is for illustration purposes only and it is understood that other transmission lines could be utilized. Since the filter 810 can be constructed monolithically, the filter 810 can be fabricated and the grounding can be provided in any metallization layer in the manner discussed and the limitations described in regards to FIGS. 6A and 6B.

Figure 9:
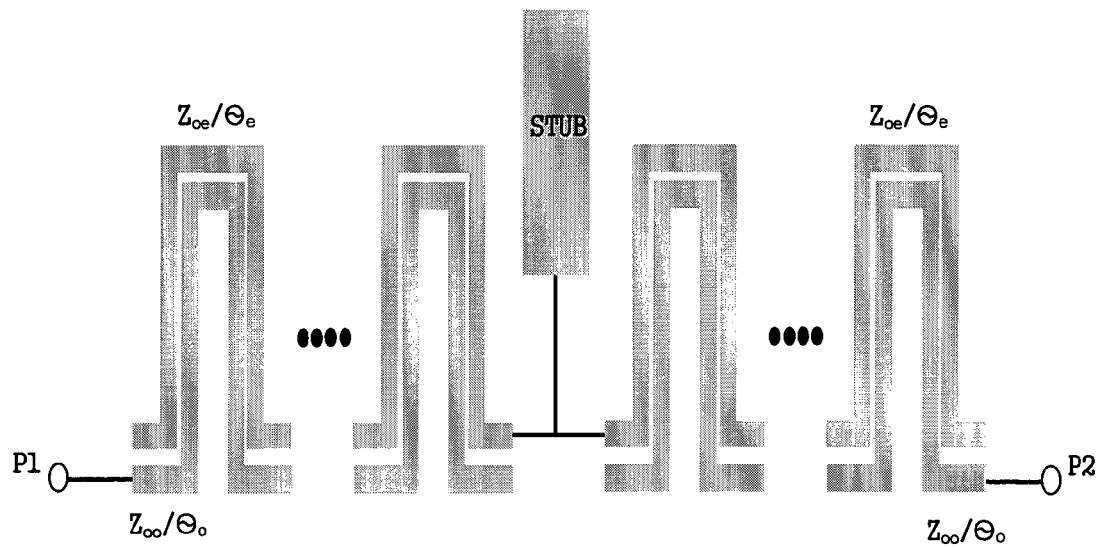
FIG. 9 is a top planar view of a non-elliptical multimode bandpass filter with meandering lines in accordance with the present embodiment wherein a ground shield is not illustrated.

As mentioned, the filter structure disclosed herein consists of two filter sections, two pairs of coupling elements and a perturbing element. The foregoing figures and illustrations have described the coupling elements by using straight transmission lines. FIG. 9 is a top planar view of a non-elliptical multimode bandpass filter 900 with meandering lines in accordance with the present embodiment. A ground shield is not depicted in FIG. 9.

While the filter 900 is fabricated using meandering microstrip transmission lines, other transmission lines are equally applicable. Instead of straight coupled transmission lines, the coupling elements have lines that couple to each other in a meandering fashion, thereby advantageously saving on expensive silicon area. While the filter 900 is a non-elliptical multimode bandpass filter, the improved structure shown in FIG. 9 is also applicable to an elliptical filter. In the filter 900, the transmission lines are all fabricated within the same metallization layer. However, those skilled in the art will realize that the transmission lines could be fabricated on any metal layer, limited only by the technology node, and that the ground shield could be a corresponding substrate ground or a ground formed within a lower metallization layer. For further miniaturization, the meandering coupled lines could be fabricated within different metallization layers. The odd impedance lines could be fabricated within a higher metallization layer, while the even impedance and stub could be fabricated within a lower metallization or vice versa, shielded by a substrate ground and/or a grounded lower metallization layer. Furthermore, the odd and even impedances lines could overlap exactly or be skewed by some distance.

Figure 10A:
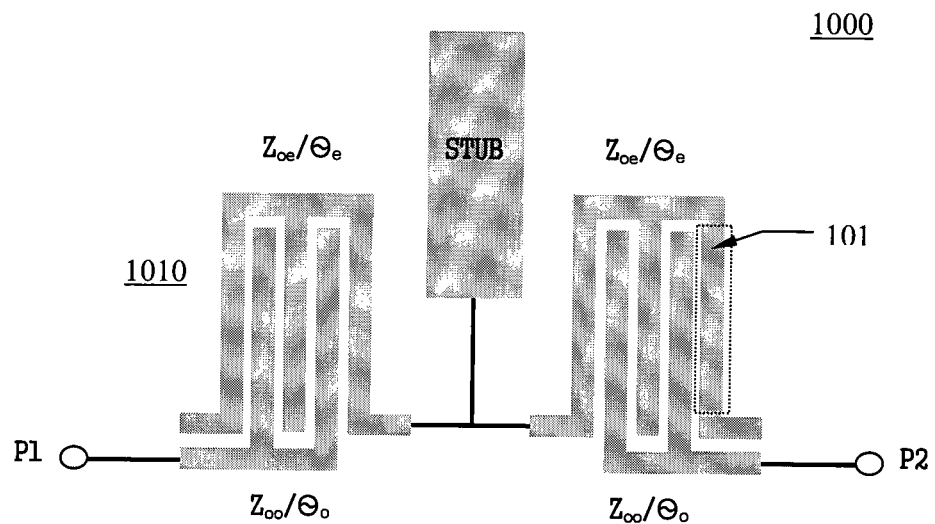
FIGS. 10A and 10B are top planar views illustrating multimode bandpass filters with interdigital lines in accordance with the present embodiment.
Figure 10B:
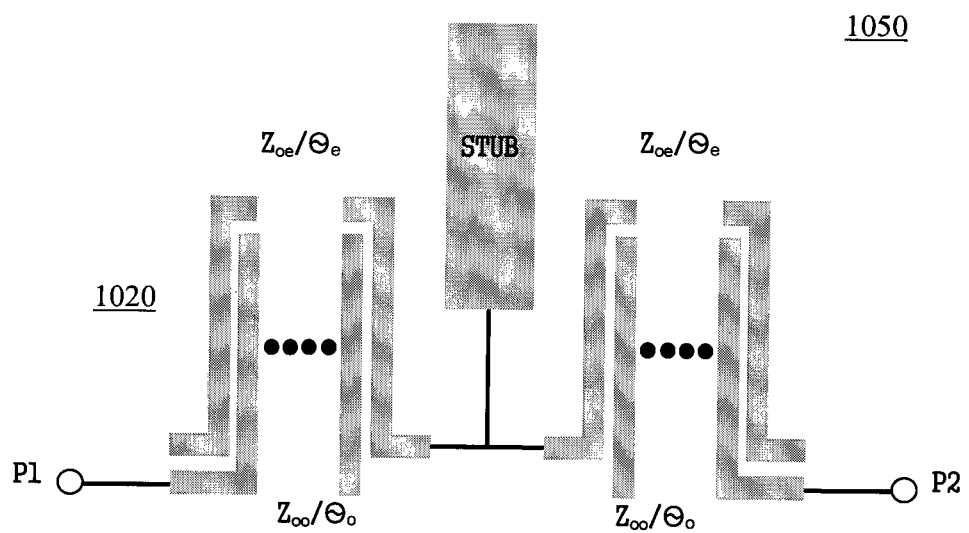

Referring to FIGS. 10A and 10B, a non-elliptical filter fabricated using interdigital fingers is depicted. FIGS. 10A and 10B are top planar views 1000, 1050 illustrating multimode bandpass filters 1010, 1020 with interdigital lines in accordance with the present embodiment. FIG. 10A is a view 1000 of a non-elliptical multimode bandpass filter 1010 with interlocking fingers for the coupled transmission lines in accordance with the present embodiment wherein a ground shield is not depicted. FIG. 10B is a view 1050 of an elliptical multimode bandpass filter 1020 with multiple interlocking fingers in accordance with the present embodiment wherein the ground shield is not illustrated. A finger 101 is shown in FIG. 10A. Interdigital refers to the process of alternating an odd impedance finger with an even impedance finger.

From the view 1000, it can be seen that there are three even impedance fingers connected to the open stub and two odd impedance fingers connected to input and output ports. When the number of even impedance finger and the number of odd impedance fingers is equal to one, the structure is the same as coupled straight or meandering transmission lines. Therefore, the number of fingers must be greater than one. The number of odd impedance fingers and the number of even impedance fingers could be equal. Or the number of odd impedance fingers could be more than or less than the number of even impedance fingers. Thus, instead of straight coupled transmission lines, coupling occurs through the interlocking fingers, saving on expensive silicon area.

In the views 1000, 1050, microstrip transmission lines are used for illustration purposes only as those skilled in the art will realize that other forms of transmission lines could also be used. In addition, the number of interlocking fingers could be much higher as shown in the filter 1020. In the views 1000, 1050, the fingers and stub are fabricated within the same metallization layer. However, as discussed before, the fingers and stub could be fabricated on any metal layer, limited only by the technology node, and having a corresponding substrate ground or a ground formed in a lower metallization layer. For further miniaturization, the fingers of the coupled lines could be fabricated on different metal layers (i.e., the odd impedance lines could be fabricated within a higher metallization layer and the even impedance lines and stub could be fabricated within a lower metallization layer, or vice versa) shielded by a substrate ground and/or a grounded lower metallization layer. Furthermore, the odd and even impedances lines could overlap exactly or skewed either horizontally, vertically or both by some distance.

Figure 11A:
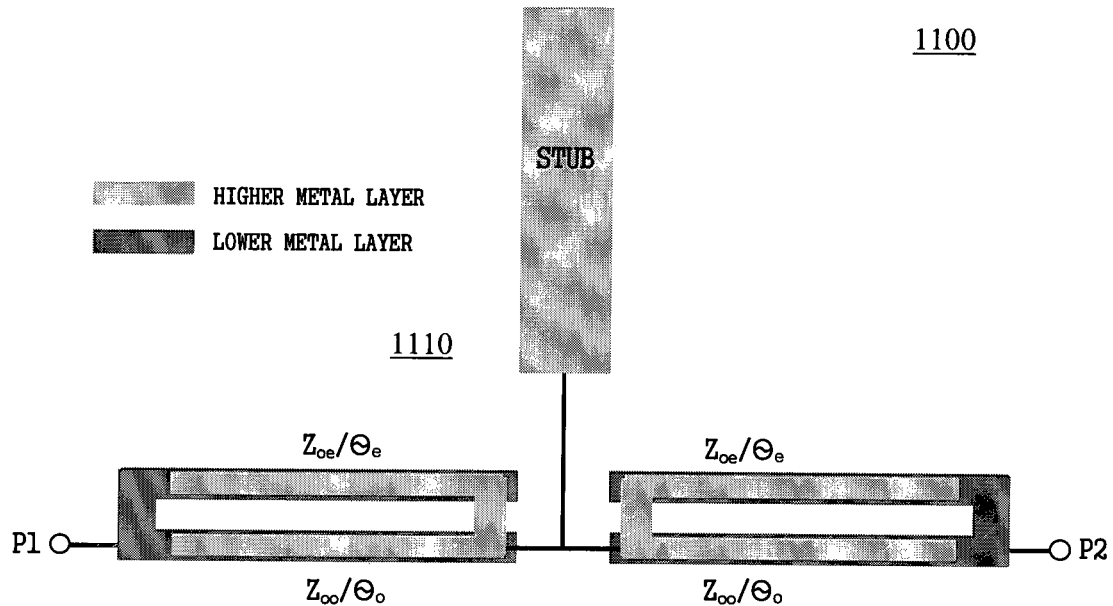
FIGS. 11A and 11B are top planar views illustrating multimode bandpass filters with hairpin resonators in accordance with the present embodiment.
Figure 11B:
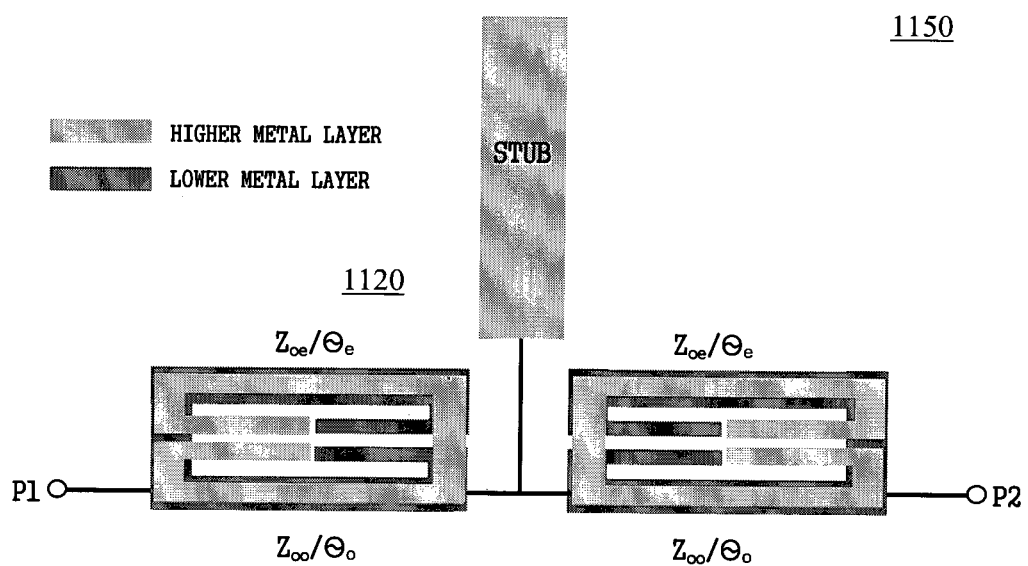

FIGS. 11A and 11B illustrate top planar views 1100, 1150 of multimode bandpass filters 1110, 1120 with hairpin resonators in accordance with the present embodiment. FIG. 11A is a view 1100 of a non-elliptical multimode bandpass filter 1110 with hairpin resonators in accordance with the present embodiment wherein a ground shield is not depicted. FIG. 11B is a view 1150 of an elliptical multimode bandpass filter 1120 with miniaturized hairpin resonators in accordance with the present embodiment wherein the ground shield is also not illustrated. Instead of straight coupled transmission lines, hair pin and miniaturized hair pin resonators could be used to provide coupling in order to reduce the requirement for expensive silicon area.

In the views 1100, 1150, the perturbing stub and the even impedance lines are fabricated within a higher metallization layer, while the odd impedance lines are fabricated within lower metallization layers. In a similar manner, the odd impedance lines could be fabricated within a higher metallization layer, while the perturbing stub and the even impedance could be fabricated within a lower metallization layer. The ground shield can either be the substrate or any metallization layer below the filter.

Figure 12:
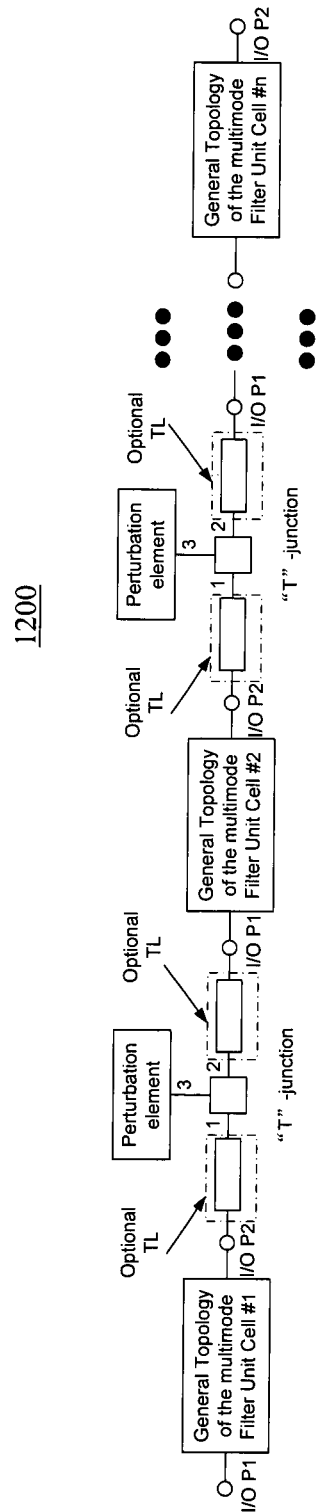
FIG. 12 is a block diagram illustrating a cascaded multimode filter topology in accordance with an alternate embodiment.

Referring to FIG. 12, a block diagram illustrating a cascaded multimode filter topology 1200 in accordance with an alternate embodiment is depicted. The bandpass filter includes a first filtering circuit and one or more second filtering circuits. Each of the first and second filtering circuits are cascaded through input and output ports thereof up to N stages (N being an integer greater than one). Similarly to the foregoing figures, each of the first and one or more second filtering circuits includes a first set of filter coupled elements, a second set of filter coupled elements and a perturbing element coupled through either a common node or a three-port "T" transmission line junction. The cascaded multimode filter topology has defined parameters that are designed and optimized to meet a predetermined filtering response.

Thus it can be seen that several schemes of high performance elliptical and non-elliptical multimode bandpass filter designs have been disclosed which advantageously provide high scalability with reduced silicon area requirements in one or more conventional integrated circuit fabrication technologies. Further, the multimode bandpass filter designs in accordance with the present embodiment have selectivity across a wider bandwidth with low insertion loss.

Due to its ability to be fabricated on a silicon-based substrate, the multimode bandpass filter designs may be miniaturized in order to be fully integrated for a complete system on chip (SoC) solution. Also, the multimode bandpass filter designs can advantageously be fabricated in a multilayered configuration for further miniaturization. While several exemplary embodiments have been presented in the foregoing detailed description of the invention, it should be appreciated that a vast number of variations exist, including variations as to the materials used to form the various layers of the magnetic recording medium.

Various embodiments may provide a multimode bandpass filter fabricated on an integrated circuit including a first set of filter coupled elements having a first set of coupled elements and coupled to a common node; a second set of filter coupled elements having a second set of coupled elements and coupled to the common node; and a perturbing element coupled to the common node, wherein a first end of a first one of the first set of filter coupled elements and a first end of a first one of the second set of filter coupled elements are coupled to the common node, and wherein a second one of the first set of filter coupled elements includes an input transmission line having an end thereof coupled to an input port and an opposite end thereof including an open end, and wherein a second one of the second set of filter coupled elements includes an output transmission line having an end thereof coupled to an output port and an opposite end thereof including an open end. In one embodiment, the perturbing element may include an open stub transmission line. Each of the first and second sets of filter coupled elements may include a pair of strongly coupled transmission lines. In an example, the bandpass filter may include a non-elliptical multimode filter, and the perturbing element may include an open-ended stub. In another example, the bandpass filter may include an elliptical multimode filter, and wherein the open end of the input transmission line and the open end of the output transmission line are each connected with a section of coupled lines wherein ends opposite the connections to the input and output transmission lines are connected to ground. In one embodiment, the bandpass filter may further include a first optional transmission line connected between the common node and the first end of the first one of the first set of filter coupled lines; and a second optional transmission line connected between the common node and the first end of the first one of the second set of filter coupled lines. A load of a circuit connected between the input port and the output port may be fifty ohms. Each transmission line of each of the first and second filter coupled elements may be selected from the group including a microstrip line, a coplanar waveguide, a stripe line, and other types of transmission lines. The first and second filter coupled elements may be selected from the group including edge-coupled coupling transmission lines, broadside coupled coupling transmission lines, meander-shaped coupling transmission lines, and spiral shaped coupling transmission lines. The first and second filter coupled elements may include one or more of a single capacitor or π-network capacitors, and the single capacitor or the π-network capacitors may be each selected from the group including a metal-insulator-metal capacitor, an interdigital capacitor, and another capacitive-type coupled element. In one embodiment, the open-ended stub may be selected from the group including a straight stub, a radial stub, a step resonator type stub, a metal-insulator-metal capacitor, a PIP capacitor, an interdigital capacitor, a MOS capacitor, another capacitive element, or any combination of one or more of these elements. In one embodiment, the bandpass filter may include a substrate on which each of the first and second filter coupled elements and the perturbing element are formed, the substrate including a material selected from the group including silicon, silicon dioxide, and another substrate material. For example, at least one of the first and second filter coupled elements may include a multilayered integrated circuit structure. In another example, the integrated circuit operating as a microwave/millimeter-wave filtering circuit may include an integrated circuit formed by an integrated circuit technology selected from the group including CMOS, GaAs, SiGe, and InP.

Various embodiments may provide a multimode bandpass filter fabricated on an integrated circuit and operating as a microwave/millimeter-wave filtering circuit including a first set of filter coupled elements; a second set of filter coupled elements; a three-port "T" transmission line junction having a first port coupled to a first end of a first one of the first set of filter coupled elements and a second port coupled to a first end of a first one of the second set of filter coupled elements, wherein a second one of the first set of filter coupled elements includes an input transmission line having an end thereof coupled to an input port and an opposite end thereof including an open end, and wherein a second one of the second set of filter coupled elements includes an output transmission line having an end thereof coupled to an output port and an opposite end thereof including an open end; and a perturbing element coupled to a third port of the three-port "T" transmission line junction. In one embodiment, the perturbing element may include an open stub transmission line. Each of the first and second sets of filter coupled elements may include a pair of strongly coupled transmission lines. In one embodiment, the bandpass filter may include a non-elliptical multimode filter, and wherein the perturbing element may include an open-ended stub. In another embodiment, the bandpass filter may include an elliptical multimode filter, and the open end of the input transmission line and the open end of the output transmission line may be each connected with a section of coupled lines wherein ends opposite the connections to the input and output transmission lines are connected to ground. In one embodiment, the perturbing element may include an open-ended stub, and a structure of the bandpass filter may have dimensions symmetrical with respect to a center line of and perpendicular to the open-ended stub. In one embodiment, the perturbing element may include an open-ended stub, and the first and second sets of filter coupled elements may be formed asymmetrical to a center line of and perpendicular to the open-ended stub. In one embodiment, the bandpass filter may include a first optional transmission line connected between the first port of the "T" transmission line junction and the first end of the first one of the first set of filter coupled lines; and a second optional transmission line connected between the second port of the "T" transmission line junction and the first end of the first one of the second set of filter coupled lines. A load of a circuit connected between the input port and the output port may be fifty ohms. Each transmission line of each of the first and second filter coupled elements may be selected from the group including a microstrip line, a coplanar waveguide, a stripe line, and other types of transmission lines. The first and second filter coupled elements may be selected from the group including edge-coupled coupling transmission lines, broadside coupled coupling transmission lines, meander-shaped coupling transmission lines, and spiral shaped coupling transmission lines. The first and second filter coupled elements may include one or more of a single capacitor or π-network capacitors, and the single capacitor or the π-network capacitors may be each selected from the group including a metal-insulator-metal capacitor, an interdigital capacitor, and another capacitive-type coupled element. The open-ended stub may be selected from the group including a straight stub, a radial stub, a step resonator type stub, a metal-insulator-metal capacitor, a PIP capacitor, an interdigital capacitor, a MOS capacitor, another capacitive element, or any combination of one or more of these elements. In one embodiment, the bandpass filter may include a substrate on which each of the first and second filter coupled elements and the perturbing element are formed, the substrate including a material selected from the group including silicon, silicon dioxide, and another substrate material. For example, at least one of the first and second filter coupled elements may include a multilayered integrated circuit structure. In another example, the integrated circuit operating as a microwave/millimeter-wave filtering circuit may include an integrated circuit formed by an integrated circuit technology selected from the group including CMOS, GaAs, SiGe, and InP.

Various embodiments may provide a bandpass filter including a first filtering circuit; and one or more second filtering circuits, wherein each of the first and one or more second filtering circuits may be cascaded through input and output ports thereof up to N stages, wherein N is an integer greater than one, to define parameters that are designed and optimized to meet a predetermined filtering response, and wherein each of the first and one or more second filtering circuits may include a first set of filter coupled elements; a second set of filter coupled elements; a three-port "T" transmission line junction having a first port coupled to a first end of a first one of the first set of filter coupled elements and a second port coupled to a first end of a first one of the second set of filter coupled elements, wherein a second one of the first set of filter coupled elements includes an input transmission line having an end thereof coupled to an input port and an opposite end thereof including an open end, and wherein a second one of the second set of filter coupled elements includes an output transmission line having an end thereof coupled to an output port and an opposite end thereof including an open end; and a perturbing element coupled to a third port of the three-port "T" transmission line junction. In one embodiment, each of the first and one or more second filtering circuits may include a first optional transmission line connected between the first port of the "T" transmission line junction and the first end of the first one of the first set of filter coupled lines; and a second optional transmission line connected between the second port of the "T" transmission line junction and the first end of the first one of the second set of filter coupled lines.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of play steps described in an exemplary embodiment without departing from the scope of the invention as set forth in the appended claims.

What is claimed is:

1. A multimode bandpass filter fabricated on an integrated circuit comprising:
   a first set of filter coupled elements having a first set of coupled elements and coupled to a common node;
   a second set of filter coupled elements having a second set of coupled elements and coupled to the common node; and
   a perturbing element coupled to the common node,
   wherein a first end of a first one of the first set of filter coupled elements and a first end of a first one of the second set of filter coupled elements are coupled to the common node, and wherein a second one of the first set of filter coupled elements comprises an input transmission line having an end thereof coupled to an input port and an opposite end thereof comprising an open end, and wherein a second one of the second set of filter coupled elements comprises an output transmission line having an end thereof coupled to an output port and an opposite end thereof comprising an open end,
   wherein the multimode bandpass filter is configured as an elliptical multimode filter, wherein the open end of the input transmission line and the open end of the output transmission line are each connected with a section of coupled lines wherein an end section of the coupled lines that is opposite the section of the coupled lines connected to the input and output transmission lines is connected to ground.

2. The bandpass filter in accordance with claim 1, wherein the perturbing element comprises an open stub transmission line.

3. The bandpass filter in accordance with claim 2, wherein the open stub is selected from the group comprising a straight stub, a radial stub, a step resonator type stub, a metal-insulator-metal capacitor, a PIP capacitor, an interdigital capacitor, a MOS capacitor, another capacitive element, or any combination thereof.

4. The bandpass filter in accordance with claim 1, wherein each of the first and second sets of filter coupled elements comprises a pair of strongly coupled transmission lines.

5. The bandpass filter in accordance with claim 1 further comprising:
   a first optional transmission line connected between the common node and the first end of the first one of the first set of filter coupled lines; and
   a second optional transmission line connected between the common node and the first end of the first one of the second set of filter coupled lines.

6. The bandpass filter in accordance with claim 1 wherein a load of a circuit connected between the input port and the output port comprises fifty ohms.

7. The bandpass filter in accordance with claim 1, wherein each transmission line of each of the first and second filter coupled elements are selected from the group comprising a microstrip line, a coplanar waveguide, a stripe line, and other types of transmission lines.

8. The bandpass filter in accordance with claim 1, wherein the input transmission line and an additional transmission line of the first filter coupled elements and the output transmission line and an additional transmission line of the second filter coupled elements are selected from the group comprising edge-coupled coupling transmission lines, broadside coupled coupling transmission lines, meander-shaped coupling transmission lines, and spiral shaped coupling transmission lines.

9. The bandpass filter in accordance with claim 1, wherein the first and second filter coupled elements comprise one or more of a single capacitor or π-network capacitors, and wherein the single capacitor or the π-network capacitors are each selected from the group comprising a metal-insulator-metal capacitor, an interdigital capacitor, and another capacitive-type coupled element.

10. The bandpass filter in accordance with claim 1 further comprising a substrate on which each of the first and second filter coupled elements and the perturbing element are formed, the substrate comprising a material selected from the group comprising silicon, silicon dioxide, and another substrate material.

11. The bandpass filter in accordance with claim 10, wherein at least one of the first and second filter coupled elements comprises a multilayered integrated circuit structure.

12. The bandpass filter in accordance with claim 10, wherein the integrated circuit operates as a microwave/millimeter-wave filtering circuit and is formed by an integrated circuit technology selected from the group comprising CMOS, GaAs, SiGe, and InP.

13. A multimode bandpass filter fabricated on an integrated circuit and operating as a microwave/millimeter-wave filtering circuit comprising:
   a first set of filter coupled elements;
   a second set of filter coupled elements;
   a three-port "T" transmission line junction having a first port coupled to a first end of a first one of the first set of filter coupled elements and a second port coupled to a first end of a first one of the second set of filter coupled elements, wherein a second one of the first set of filter coupled elements comprises an input transmission line having an end thereof coupled to an input port and an opposite end thereof comprising an open end, and wherein a second one of the second set of filter coupled elements comprises an output transmission line having an end thereof coupled to an output port and an opposite end thereof comprising an open end; and
   a perturbing element coupled to a third port of the three-port "T" transmission line junction,
   wherein the multimode bandpass filter is configured as an elliptical multimode filter, wherein the open end of the input transmission line and the open end of the output transmission line are each connected with a section of coupled lines wherein an end section of the coupled lines that is opposite the section of the coupled lines connected to the input and output transmission lines is connected to ground.

14. The bandpass filter in accordance with claim 13, wherein the perturbing element comprises an open-ended stub, and wherein the bandpass filter has dimensions symmetrical with respect to a center line of and perpendicular to the open-ended stub.

15. The bandpass filter in accordance with claim 13 further comprising:
- a first optional transmission line connected between the first port of the "T" transmission line junction and the first end of the first one of the first set of filter coupled lines; and
- a second optional transmission line connected between the second port of the "T" transmission line junction and the first end of the first one of the second set of filter coupled lines.

16. A bandpass filter comprising:
a first filtering circuit; and
one or more second filtering circuits, wherein each of the first and one or more second filtering circuits are cascaded through input and output ports thereof up to N stages, wherein N is an integer greater than one, to define parameters that are designed to meet a predetermined filtering response, and wherein each of the first and one or more second filtering circuits comprises:
   a first set of filter coupled elements;
   a second set of filter coupled elements;
a three-port "T" transmission line junction having a first port coupled to a first end of a first one of the first set of filter coupled elements and a second port coupled to a first end of a first one of the second set of filter coupled elements, wherein a second one of the first set of filter coupled elements comprises an input transmission line having an end thereof coupled to an input port and an opposite end thereof comprising an open end, and wherein a second one of the second set of filter coupled elements comprises an output transmission line having an end thereof coupled to an output port and an opposite end thereof comprising an open end; and
a perturbing element coupled to a third port of the three-port "T" transmission line junction,
wherein at least one of the first and one or more second filtering circuits is configured as an elliptical multimode filter, wherein the open end of the input transmission line and the open end of the output transmission line are each connected with a section of coupled lines wherein an end section of the coupled lines that is opposite the section of the coupled lines connected to the input and output transmission lines is connected to ground.

17. The bandpass filter in accordance with claim 16 wherein each of the first and one or more second filtering circuits comprise:
- a first optional transmission line connected between the first port of the "T" transmission line junction and the first end of the first one of the first set of filter coupled lines; and
- a second optional transmission line connected between the second port of the "T" transmission line junction and the first end of the first one of the second set of filter coupled lines.

* * * * *